United States Patent
Kalkunte et al.

(10) Patent No.: US 8,804,503 B2
(45) Date of Patent: Aug. 12, 2014

(54) FLOW REGULATION SWITCH

(75) Inventors: Mohan Kalkunte, Saratoga, CA (US);
Bruce Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1120 days.

(21) Appl. No.: 11/934,196

(22) Filed: Nov. 2, 2007

(65) Prior Publication Data

US 2009/0003209 A1 Jan. 1, 2009

Related U.S. Application Data

(60) Provisional application No. 60/937,841, filed on Jun. 29, 2007.

(51) Int. Cl.
*H04J 3/16* (2006.01)
*H04L 12/56* (2006.01)
*H04L 5/00* (2006.01)

(52) U.S. Cl.
CPC .............. *H04L 47/10* (2013.01); *H04L 5/0053* (2013.01)
USPC .......................................... 370/229; 370/236

(58) Field of Classification Search
CPC ......... H04L 47/10; H04L 47/30; H04L 47/11; H04L 47/12; H04L 2012/5631; H04L 47/15; H04L 47/2441; H04L 47/70; H04L 47/22; H04L 12/5602
USPC ................................................. 370/229–236
See application file for complete search history.

(56) References Cited

U.S. PATENT DOCUMENTS

| | | | | |
|---|---|---|---|---|
| 5,898,670 A * | 4/1999 | Hoebeke et al. | ............... | 370/468 |
| 6,674,718 B1 * | 1/2004 | Heddes et al. | ............... | 370/230 |
| 6,704,280 B1 * | 3/2004 | Mangin et al. | ............... | 370/230 |
| 6,738,371 B1 * | 5/2004 | Ayres | ............... | 370/352 |
| 6,771,601 B1 * | 8/2004 | Aydemir et al. | ............... | 370/231 |
| 6,957,269 B2 * | 10/2005 | Williams et al. | ............... | 709/235 |
| 7,062,568 B1 * | 6/2006 | Senevirathne et al. | ....... | 709/234 |
| 7,221,678 B1 * | 5/2007 | Hughes | ............... | 370/412 |
| 7,236,459 B1 * | 6/2007 | Okholm et al. | ............... | 370/231 |

(Continued)

OTHER PUBLICATIONS

Hugh Barrass, Definition for new PAUSE function, May 30, 2007, published by ieee802.org (available at http://www.ieee802.org/1/files/public/docs2007/new-cm-barrass-pause-proposal.pdf—last checked May 8, 2009).*

Yi Lu, et al., Congestion control in networks with no congestion drops, Sep. 2006, pp. 1-8.

*Primary Examiner* — Steven H Nguyen
(74) *Attorney, Agent, or Firm* — McDermott Will & Emery LLP

(57) ABSTRACT

A network switch includes a plurality of egress ports configured to send packets of data traffic to at least one receiving network device and a plurality of ingress ports configured to receive the packets of data traffic from at least one sending network device. The switch further includes a switch logic engine configured to define multiple flows of data through the switch from a sending network device to a receiving network device and to route the flows from the ingress port to the egress port, a flow monitor configured to measure at least one flow attribute of the flows, and a flow regulation engine configured to regulate a flow rate of flows sent by a sending network device based at least in part on a measurement by the flow monitor of the at least one flow attribute of the packets.

20 Claims, 3 Drawing Sheets

(56) References Cited

U.S. PATENT DOCUMENTS

| | | | |
|---|---|---|---|
| 7,408,876 B1 * | 8/2008 | Gupta et al. | 370/230 |
| 7,525,911 B2 * | 4/2009 | Hara et al. | 370/230.1 |
| 7,639,608 B1 * | 12/2009 | Jain et al. | 370/229 |
| 2002/0031091 A1 * | 3/2002 | van Everdingen | 370/236 |
| 2002/0124114 A1 * | 9/2002 | Bottom et al. | 709/251 |
| 2002/0136163 A1 * | 9/2002 | Kawakami et al. | 370/229 |
| 2007/0127378 A1 * | 6/2007 | Yang et al. | 370/235 |

* cited by examiner

FLOW REGULATION SWITCH

CROSS-REFERENCE TO RELATED APPLICATIONS

This application claims priority under 35 U.S.C. §119(e) to U.S. Provisional application Ser. No. 60/937,841, filed on Jun. 29, 2007, entitled "Flow Regulation Switch," which is hereby incorporated by reference.

TECHNICAL FIELD

This description relates to network switches.

BACKGROUND

Network switches may be used to route data between network devices in a computer network. A switch can receive input data from multiple modules and can output data to multiple modules. At times, the data routed to a particular device may exceed the receiving device's capacity to process the data. This data traffic congestion may result in the device either delaying processing of the data, or dropping the data.

An approach to dealing with data traffic congestion in network switches may include using virtual output queuing (VOQ), in which multiple virtual input queues at the input ports of the switch can be used to simulate an efficient output queuing scheme for routing traffic through the switch. A central arbiter within the switch can coordinate the traffic flows from the input ports to the output ports and can handle the necessary messaging the input ports and the output ports of the switch. While VOQ provides an efficient traffic management scheme, the required central arbiter and messaging is expensive to implement in a commercial off the shelf switch. In addition, the granularity of the messaging and queuing is typically associated with the physical system attributes (e.g., the number of ports in a switch) and not capable of supporting finer granularity of messaging such as at the flow granularity.

A more inexpensive approach is to use simple input buffers to manage the traffic flow through the switch, and when data traffic congestion exists to use a link level pause to halt all input traffic entering the switch on a particular input port when a traffic flow entering the switch on the input port exceeds a preset threshold level. However, this approach results in head-of-line blocking, which can degrade the performance of the switch significantly.

SUMMARY

A flow regulation switch and a method for regulating traffic flow, substantially as shown in and/or described in connection with at least one of the figures, as set forth more completely in the claims, are disclosed. The details of one or more implementations are set forth in the accompanying drawings and the description below. Other features will be apparent from the description and drawings, and from the claims.

DETAILED DESCRIPTION

Figure 1:
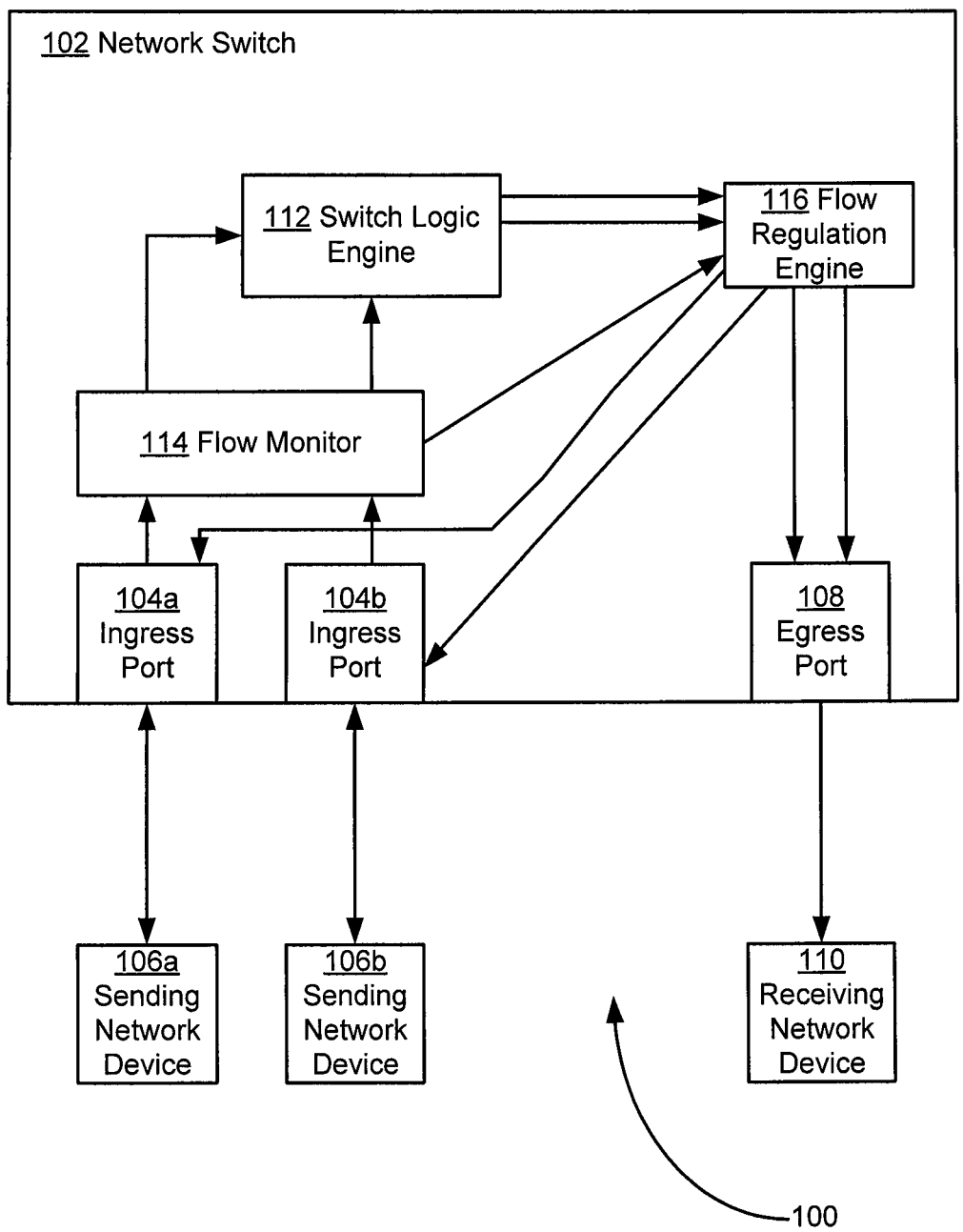
FIG. 1 is a block diagram of a network implementing a network switch according to an example embodiment.

FIG. 1 is a block diagram of a network 100 implementing a network switch 102 according to an example embodiment. The network may include several computing devices (e.g., processors, personal computers, servers) that communicate with each other by exchanging information through the switch 102. The network 100 may include, for example, a local area network (LAN) or wide area network (WAN), and may implement the Ethernet protocol to provide network access to many different users or devices 106a, 106b, and 110. The network 100 may be implemented, for example, for a corporation or other business at one or more physical locations thereof. The network 100 may also represent a network providing service to a plurality of consumers at their respective houses or other locations through computing devices 106a, 106b, and 110. In other implementations, the network can be a blade server that includes several processors 106a, 106b, and 110 that communicate through a backplane switch 102. The network can also be an array of storage devices 106a, 106b, and 110 that communicate through a switch 102, for example, in a redundant array of inexpensive disks (RAID). Of course, these are but a few, non-limiting examples of types of networks represented by the network 100, and many other non-limiting examples of networks that are interoperable with, or make use of, the network switch 102, may be used as well.

In the example shown in FIG. 1, the network switch 102 provides switching for the network 100. The network switch 102 may be, for example, a backplane switch that provides a switching fabric for routing data from one device 106a, 106b, or 110 to another device 106a, 106b, or 110. The network switch 102 may receive and transmit data through the network 100, such as in the form of packets or frames. As used herein, "packet" may refer to a group of data transmitted through a network, whether framed or unframed.

The network switch 102 may include multiple ingress ports 104a and 104b configured to receive packets transmitted from a sending network device 106a or 106b. Receiving packets from multiple sending network devices 106a and 106b through multiple ingress ports 104a and 104b may cause congestion, such as in the network switch 102, at an egress port 108, or at a receiving network device 110, according to an example implementation.

The network switch 102 may also include multiple egress ports 108 configured to send packets output data from the switch 102 through the network 100 to a receiving network device 110. The packets sent through the network 100 by the egress port 108 may be the same packets received by the ingress ports 104a and 104b. In the example embodiment in which the network device 102 includes two or more ingress ports 104a and 104b, the egress port 108 may send the packets received by both ingress ports 104a and 104b to the receiving network device 110. In an example implementation, the receiving network device 110 may have enough processing capacity to process the packets sent by a single sending network device 106a, but may not have enough capacity to process the packets sent by two or more sending network devices 106a and 106b when the sending device are transmitting at their full rates.

In an example embodiment, the receiving network device 110 may include a central processing unit (CPU), such as a CPU on a blade of a parallel processing computer, or may include a breakout switch coupled to other devices in the network 100.

The network switch 102 also includes a switch logic engine 112 configured to route the packets from the ingress ports 104a and 104b to the egress ports 106 of the switch. The switch logic engine 112 may determine a routing of packets between the ports 104a, 104b, and 106 based on, for example, a destination address included in a header of the packets. In an example implementation that uses the Transport Control Protocol of the Internet Protocol (TCP/IP), the destination address may be included in a header of an Internet Protocol frame.

The destination address may be associated with one of the network devices 110 coupled with one of the egress ports 106. In this example, the switch logic engine 112 may route a flow of packets to the port 106 that is coupled with the network device 110 with which the destination address is associated.

Data traffic entering an ingress port 104a or 104b can include traffic that has been assigned different priority levels for service by the switch 102. For example, control traffic can have the highest priority level; expedited forwarding (EF) traffic can have the next highest priority level, and then the remaining best efforts (BE) traffic be categorized into one or more different priority levels. Control traffic can include data traffic for coordinating the processing of various modules that are connected to each other through the switch. EF traffic can include data traffic that requires a low-latency delivery (e.g., voice or video traffic). BE traffic can include traffic for which low latency is not a strict requirement (e.g., text or numerical data). A header field in the packets of the data may also include a data type of the data included in the packets, which may be used to determine whether the packet is control traffic, EF traffic, or BE traffic. For example, a Differential Services Code Point (DSCP) field in the Internet Protocol (IP) header of the packet can be used to determine the type of traffic carried by the packet.

A series of packets received by the network device 102, such as at an ingress port 104a may be considered as a "flow" of packets. The flow may have a number of flow attributes, such as a flow rate of the packets, a burst rate of the packets, a burst duration of the packets, a rate of receiving packets with a particular destination address (including a flow rate of these packets), such as a destination addresses associated with the receiving network device 110, or a data type of the packets in the flow. Thus, a particular input stream of packets arriving at an ingress port 104a or 104b can be categorized by a number of different flows that each have different characteristics. For example, an input stream of packets arriving at an ingress port 104a may include packets destined for different receiving network devices and/or different egress ports, and different flows may be denoted that include the packets destined for the different destinations. In another example, an input stream of packets arriving at an ingress port 104a may include packets containing voice data (which requires low latency delivery) and numerical data (that does not require low latency delivery) and different flows may be denoted that include the packets containing the different types of data. Different flows also may be characterized by combinations of different attributes. For example, a flow entering an ingress port 104a can be designated as the EF packets destined for a particular egress port 108 that encode voice data.

The flow rate of the packets in a particular flow may be characterized by, for example, a number of bits received by the network device 102 per unit of time, and may include either an average rate or a peak rate. The rate of receiving packets with the particular destination address may be characterized by, for example, a number of packets received with the particular destination address per unit of time. The data type of the packets may include a type of data included in the packets, such as video data, voice data, or text data. The packets may include a header field indicating the data type (e.g., a MIME type for the packets), according to an example embodiment.

The network switch 102 may also include a flow monitor 114 configured to measure at least one flow attribute of the packets. The flow monitor 114 may, for example, be coupled to the switch logic engine 112 and measure the flow attribute(s) of the packets routed by the switch logic engine 112. Various implementations of the flow monitor 114 may measure the flow rate of the packets in a flow, the burst rate of the packets in the flow, the burst duration of the packets in the flow, the rate of receiving packets with a particular destination addresses (of, for example, the egress port 108 associated with a particular network device 110 or group of network devices) and/or the data type of the packets. The flow monitor 114 may measure these flow attributes in the aggregate, such as an aggregate flow rate of packets that are destined to exit the switch through a particular egress port 108 that enter the switch through any ingress ports 104a and 104b. The flow monitor also may measure these flow attributes for individual flows that enter the switch through particular individual ingress ports 104a and 104b and that exit the switch through a particular egress port 108. When measuring the contributions from each ingress port 104a and 104b the flow monitor 114 may provide information as to which sending network device 106a and 106b is contributing most to congestion within the switch 102 when routing data traffic from sending network devices 106a and 106b to receiving network devices 110.

The flow monitor 114 may be coupled to, or included in, a flow regulation engine 116. The flow regulation engine 116 may be included in the network device 102, and may be configured to coordinate the regulation of the flow rate of the packets, for example, by sending messages to the transmitting devices 106a and 106b to tell the devices to reduce their traffic input to the switch 102. According to an example embodiment, the flow regulation engine 116 may regulate the flow rate of the packets sent by the at least one sending network device 106a and 106b based at least in part on the measurement by the flow monitor 114 of at least one flow attribute of the packets. The flow regulation engine 116 may regulate the flow rate of all of the sending network devices 106, or may regulate the flow rate of the sending network device(s) which are contributing most to the congestion, according to an example embodiment.

In an example embodiment, the flow regulation engine 116 may regulate the flow rate of the packets sent by a sending network device 106a by sending a message to the sending network device 106a or 116b instructing the device to modify the flow of its data traffic to the switch 112. The flow regulation engine 116 may send the message to the sending network device 106a or 116b based at least in part on at least one flow attribute. The regulated flow attribute may be, for example, a flow rate of the packets that exceeds threshold flow rate. The threshold flow rate can be determined based on a predetermined or measured information processing rate of the receiving network device 110, or can be based on a rate that causes an acknowledgment delay between the receiving network device 110 and the sending network device 106a and 116b to exceed a predetermined rate.

In one implementation, the traffic flows can be governed by token bucket algorithm parameters (e.g., a bucket depth and a token rate). The concept of the token bucket model is that a token bucket fills up with tokens that are added to the bucket when packets in the flow pass through the bucket and that tokens are drained from the bucket at a constant rate. When the bucket is full, then additional packets cannot be sent until the bucket is at least partially drained. Thus, the rate at which the bucket is drained dictates the average rate of traffic flow, while the depth of the bucket dictates how "bursty" the traffic is allowed to be. Token bucket parameters may be different for different traffic types. For example, video data with a refresh rate of 75 frames per second, with each frame taking 10 packets, might specify a token rate of 750 Hz and a bucket depth of only 10. The bucket depth would be sufficient to accommodate the 'burst' associated with sending an entire frame all at once. On the other hand, a voice conversation may need a lower token rate but a much higher bucket depth because there are often pauses in conversations. Thus token bucket parameters for a flow of voice traffic may use a relatively low token rate but a deeper bucket depth to compensate for the traffic being relatively bursty.

When a data traffic flow is out of its pre-assigned profile (e.g., as determined by its token bucket parameters), the flow regulation engine 116 can send a message to the sending network device 106a or 106b from which the out-of-profile traffic flow originates to tell the device to correct the problem. The traffic flow can be tracked at different levels or according to different characteristic parameters to determine whether it is out of profile. For example, the traffic flow may be determined to be out of profile based on the flow rate's average rate or based on the flow rate's max burst duration being out of profile. The message to regulate the traffic flow may be based at least in part on the flow attribute measured by the flow monitor 114. If the definition of the flow is also bound to specific buffer or queue state utilization, the message may also be based in part on that information as well. In response to the message, the sending network device 106a or 106b may reduce a rate of, or temporarily stop, sending further packets. Thus, the message may be configured to cause the sending network device(s) to reduce the rate of, or temporarily stop, sending further packets.

The flow monitor 114 may be used to address cases of persistent congestion (as opposed to transient congestion). Transient congestion may include cases of congestion having a timescale that is shorter than the time it takes for the flow regulation engine 116 to notify the offending sending network device 106a or 106b and for the device to respond to the notification. Persistent congestion may include cases of congestion having timescales that are longer than the sum of the notification delay and the response delay.

In cases of persistent congestion, the network switch 102 may use flow rate notification to regulate the data traffic flow from one or more sending devices 106a or 106b to one or more receiving traffic devices 110. As discussed above, the flow monitor 110 measures the flow rate of various microflows of data traffic that enter the switch through an ingress port 104a or 104b and exit the switch through an egress port 108. The microflows can be defined by their ingress port and their egress port, by their type of data traffic (e.g., Control traffic, EF traffic, or BE traffic). The measurement of a flow rate of a particular flow can include a measurement of the average rate of the flow or the burst rate of the flow. When a flow rate is out of profile for a particular flow, the flow regulation engine can notify the sending device 106a or 106b that is sending the flow and can require the sending device to modify its transmission to bring the flow back within profile. Thus, flow rate notification may include reducing the flow rate of a traffic flow based on a one flow attribute measured by the flow monitor, as described above. This provides a central monitor of traffic flows located within the switch 102 rather than relying on notifications from receiving network devices 110 or from individual egress ports to provide a notification of congestion in the switch. Also, because the monitoring occurs on the flow level, rather than on the link level, individual traffic flows can be controlled and regulated, rather than blocking all traffic entering a particular ingress port, which avoids the problem of head of line blocking.

The flow meter 110 and/or the flow regulation engine 112 can also consider the queue state of the egress port 108 and utilize a form of egress queue congestion notification to augment the flow rate notification that is sent to the sending network device 106a or 106b. For example, if a particular traffic flow is temporarily out of profile but the egress queue 110 through which the flow is output from the switch is relatively empty, the switch may be able to temporarily tolerate a flow rate that is higher than the profile for the flow would otherwise allow. A particular egress port 108 might have different queues dedicated to the handling of different types of traffic, and the queue state of each of these queues might be monitored so that out-of-profile flows could be tolerated temporarily. For example, an out-of-profile Control traffic flow might be tolerated temporarily if the control traffic queue is relatively empty, but an out-of-profile BE traffic flow might be tolerated temporarily only if the control traffic queue, the EF queue and the BE queue are all relatively empty.

Figure 2:
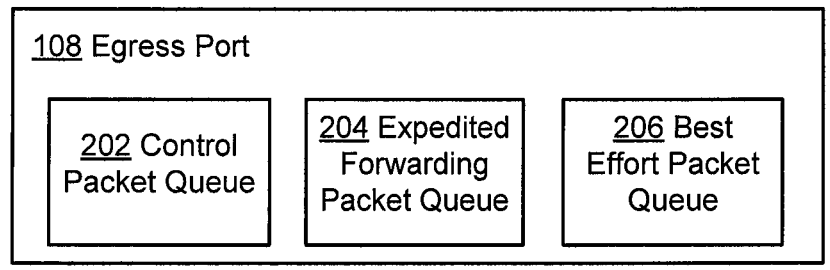
FIG. 2 is a block diagram of an egress port including a plurality of queues according to an example embodiment.

FIG. 2 is a block diagram of the egress port 108 including a plurality of queues 202, 204, and 206, according to an example embodiment. According to this example embodiment, the egress port 108 includes the plurality of queues 202, 204, and 206 for temporarily storing the packets. The plurality of queues 202, 204, and 206 may temporarily store the packets when, for example, the network switch 102 receives the packets at a rate faster than either the egress port 108 can send the packets or the receiving network device 110 can receive or process the packets.

For example, the switch logic engine 112 may route each of the packets into one of the plurality of queues 202, 204, and 206 based at least in part on information included in each of the packets. The information included in each of the packets, based upon which the switch logic engine 112 may determine which queue to store the packets in, may include, for example, a data type of the packets, a priority level of the packets, and/or a source address of the packets. The switch logic engine 112 may, for example, select which of the packets to send to the receiving network device 110 based at least in part on a priority level of the queues in which the packets are stored.

The different queues 202, 204, and 206 also may be relevant to determining an arbitration order for selecting which packets are sent out of the egress port 108 first, providing preferential treatment to some of the packets based on the queues in which they are stored. For example, control traffic expedited forwarding traffic may be sent out of the egress port 108 with preferential treatment over BE traffic. According to an example embodiment, the lower priority queue(s) (e.g., for handing BE data traffic) may be allocated some minimal level of bandwidth so that the packets stored in these queues are not prevented from ever being sent if the higher priority queue(s) do not become empty.

According to the example embodiment shown in FIG. 2, the egress port 106 includes a control packet queue 202, a forwarding packet queue 204, and a best effort packet queue 206. The control packet queue 202 may store packets containing control information, such as instructions regarding processing data. In an example embodiment, packets stored in the control packet queue 202 may have the highest priority level, and may be sent to the receiving network device 110 before packets stored in the expedited forwarding packet queue 204 or best effort packet queue 206. The expedited forwarding packet queue 204 may store packets that are marked as high priority. Packets stored in the expedited forwarding packet queue 204 may have a lower priority than packets stored in the control packet queue 202, but a higher priority than packets stored in the best effort packet queue 206. The best effort packet queue 206 may store packets which have not been marked as high priority. Packets stored in the best effort packet queue 206 may have the lowest priority, and may be sent to the receiving network device only when the control packet queue 202 and the expedited forwarding packet queue 204 are empty.

Figure 3:
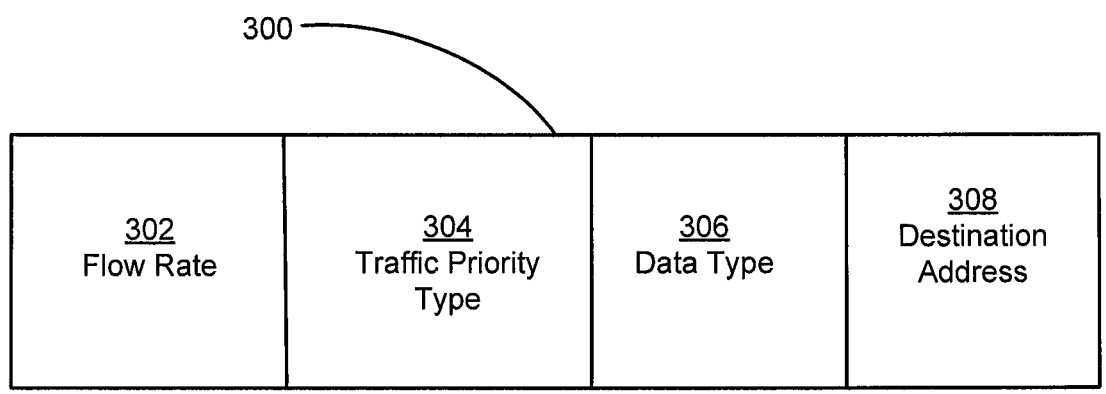
FIG. 3 is a block diagram of a portion of a message sent by the network switch to a sending network device according to an example embodiment.

FIG. 3 is a block diagram of a portion of a message 300 sent by the network switch 102 to a sending network device 106a or 106b to notify the sending device that at least one traffic flow that it is transmitting through the switch is out of profile. In the example embodiment shown in FIG. 3, the message may include some or all of the following information, so that the sending device can identify the offending traffic flow and take action to correct it: a measured flow rate 302 of the offending flow, a traffic priority type 304 of the offending flow, and a data type 306 of the offending flow, and a destination address 308 of the packets in the offending flow. In an example embodiment, the sending network device(s) 106 may determine whether to reduce or temporarily stop sending packets to the network switch 102 based on the flow rate 302, traffic priority type 304, and/or the data type 306 included in the message 300.

Figure 4:
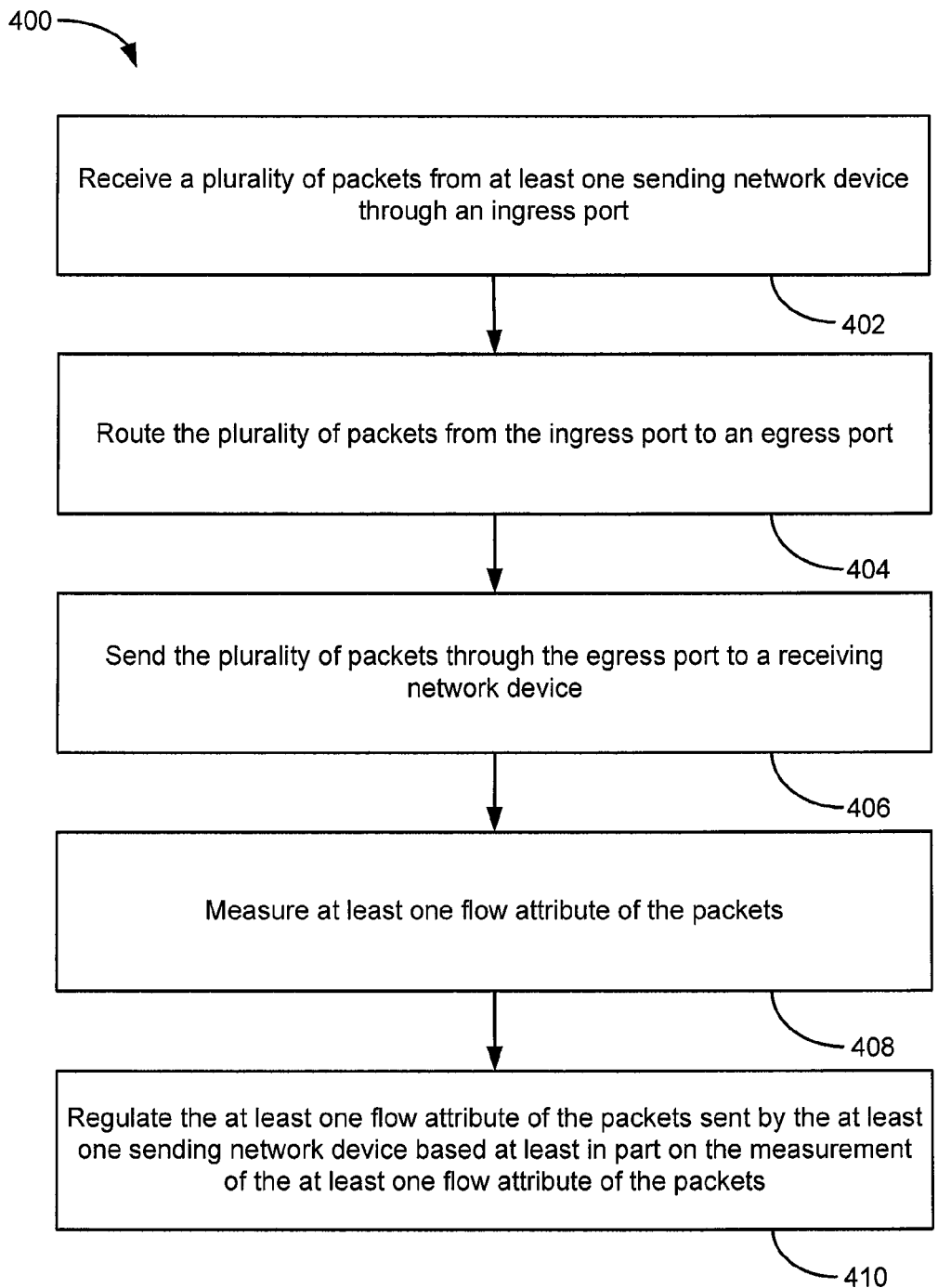
FIG. 4 is a flowchart illustrating a method according to an example embodiment.

FIG. 4 is a flowchart illustrating a method 400 according to an example embodiment. According to this example, the method 400 may include receiving a plurality of packets from at least one sending network device 106 (402). The plurality of packets may be received, for example, through at least one ingress port 104. The method may further include sending the plurality of packets to a receiving network device 110 (404). The plurality of packets may be sent, for example, through an egress port 108. In an example embodiment, the method 400 may further include routing the packets from the at least one ingress port 104 to the egress port 108 (406), such as by a switch logic engine 112.

The method 400 may further include measuring at least one flow attribute of the packets (408), such as by a flow monitor 114. Also, the method may include regulating a flow attribute of the packets sent by the at least one sending network device 106 based at least in part on a measurement by the flow monitor 114 of the at least one flow attribute of the packets (410). Regulating the flow attribute may be performed, for example, by a flow regulation engine 116, according to an example embodiment. The degree to which a flow is out-of-profile, as well as the congestion state of buffering or queue state associated with the flow meter, may also be provided in the flow message as well to influence the reaction of the sending network device(s).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. The computer program may be written in any form of programming language, including compiled or interpreted languages, and may be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A network switch comprising:
a switch logic engine configured to define a flow of data packets through the network switch from a sending network device to a receiving network device;
a flow monitor configured to measure a flow attribute of the flow; and
a flow regulation engine configured to:
regulate a flow rate of the flow based at least in part on the measured flow attribute; and send a message to the sending network device when a flow rate of a flow exceeds a threshold rate, the sending of the message not being based on receiving a notification from the receiving network device, the message indicating that the threshold rate has been exceeded and being configured to cause the sending network device to reduce a rate of sending the further packets, wherein the threshold rate is based on a measured information processing rate of the receiving network device.

2. The network switch of claim 1, further comprising:
at least one egress port includes including a plurality of queues configured to store and output packets of the flow wherein the switch logic engine is configured to route packets of the flow to one of the plurality of queues based at least in part on information included in each of the packets and to select packets to send to the receiving network device based at least in part on a priority level of the queues in to which the packets are routed.

3. The network switch of claim 2, wherein:
the plurality of queues includes a control packet queue, an expedited forwarding packet queue, and a best effort packet queue.

4. The network switch of claim 1, wherein the receiving network device includes a processor of a blade of a server.

5. The network switch of claim 1, wherein:
the flow attribute includes a flow rate of packets in different flows that enter the network switch through two different ingress ports of the network switch and that exit the network switch through an egress port of the network switch.

6. The network switch of claim 1, wherein: the message is further based on a degree to which the flow rate of the packets exceeds the predetermined threshold rate.

7. The network switch of claim 1, wherein:
when the flow rate of the flow exceeds the threshold rate, the flow regulation engine is further configured to send a message to the sending network device identifying a state of a queue through which the flow is intended to be routed.

8. The network switch of claim 1, wherein the flow attribute includes a burst rate of the packets in the flow and a burst duration of the packets in the flow.

9. The network switch of claim 1, wherein the flow attribute includes a rate of receiving packets with a particular destination address.

10. The network switch of claim 1, wherein the flow attribute includes a data type of the packets in the flow.

11. The network switch of claim 2, wherein the flow regulation engine is configured to send the message to the sending network device when the flow rate of the flow exceeds the threshold rate and a number of packets stored in at least one of the plurality of queues included in the at least one egress port is greater than a queue threshold.

12. The network switch of claim 1, wherein the message identifies the flow rate of the flow, the traffic priority type of the flow, and a data type of the flow.

13. The network switch of claim 1, wherein the message identifies a traffic priority type and is configured to cause the sending network device to reduce a rate of sending the further packets identified by the traffic priority type.

14. The network switch of claim 1, wherein the threshold rate is based on a rate that causes an acknowledgment delay between the receiving network device and the sending network device to exceed a predetermined rate.

15. A method comprising:
receiving a data traffic flow from a sending network device at a switch;
measuring a flow attribute of the data traffic flow;
regulating a flow rate of the data traffic flow based at least in part on the measured flow attribute; and
sending a message to the sending network device when the flow rate of the data traffic flow exceeds a threshold rate without receiving a notification from a receiving network device, the message being configured to cause the sending network device to reduce a rate of sending the further packets,
wherein the threshold rate is based on a measured information processing rate of the receiving network device.

16. The method of claim 15, wherein the message identifies a traffic priority type and is configured to cause the sending network device to reduce a rate of sending the further packets identified by the traffic priority type.

17. A method comprising:
receiving a plurality of data traffic flows from a sending network device at a plurality of ingress ports of a backplane switch;
routing each data traffic flow from an ingress port to an egress port of the backplane switch;
sending each data traffic flow from the egress port to which it is routed to a receiving network device;
measuring a flow attribute of each data traffic flow;
regulating a flow rate of each data traffic flow based at least in part on the measured flow attribute corresponding to each data traffic flow; and
sending a message to the sending network device when the flow rate of a flow exceeds a threshold rate without receiving a notification from the receiving network device, the message being configured to cause the sending network device to reduce a rate of sending the further packets,
wherein the threshold rate is based on a measured information processing rate of the receiving network device.

18. The method of claim 17, wherein measuring a flow attribute comprises measuring an average flow rate for a data traffic flow of packets of a particular data type entering the switch at a particular ingress port and exiting the switch at a particular egress port.

19. The method of claim 17, further comprising monitoring a state of a queue at an egress port, and wherein regulating at least one of the data traffic flows is based at least in part on the measurement of the flow attribute for the flow and on the state of the queue through which the flow passes when exiting the switch.

20. The method of claim 17, wherein the message identifies a traffic priority type and is configured to cause the sending network device to reduce a rate of sending the further packets identified by the traffic priority type.

* * * * *